United States Patent [19]

Stroman

[11] 3,818,300

[45] June 18, 1974

[54] CONVEYOR SERVO MOTOR STOPPING CONTROL UNIT

[76] Inventor: Larry J. Stroman, 8411 Carvell, Houston, Tex. 77036

[22] Filed: Oct. 24, 1972

[21] Appl. No.: 300,178

[52] U.S. Cl. .............................. 318/561, 318/467
[51] Int. Cl. ........................................... G05b 13/00
[58] Field of Search ........... 318/664, 665, 596, 597, 318/624, 663, 672, 674, 561, 467

[56] References Cited
UNITED STATES PATENTS

| | | | |
|---|---|---|---|
| 2,786,169 | 3/1957 | Muffly | 318/664 |
| 3,020,459 | 2/1962 | Feigleson | 318/665 |
| 3,155,889 | 11/1964 | Stiles et al. | 318/664 X |
| 3,196,429 | 7/1965 | Gross et al. | 318/665 |
| 3,209,338 | 9/1965 | Romvari | 318/561 X |
| 3,211,977 | 10/1965 | Buttenhoff et al. | 318/665 |
| 3,731,171 | 5/1973 | Holley, Jr. | 318/664 X |

Primary Examiner—T. E. Lynch

[57] ABSTRACT

A self balancing servo system is disclosed for positioning a controlled element at a plurality of discrete positions. Switch means is provided for conducting a mark signal to the servo system when said controlled element is a coast distance from a discrete position, and means is provided for combining the mark signal with an error signal representative of the position of the controlled element with respect to a desired position. When this combined signal is below a certain voltage level, a stop signal is generated and the drive to the controlled element is stopped and the controlled element is permitted to coast to a stop at the desired position. Also, a short route circuit is disclosed for controlling direction of movement of the controlled element, when it is a 360° element such as an endless conveyor.

4 Claims, 7 Drawing Figures

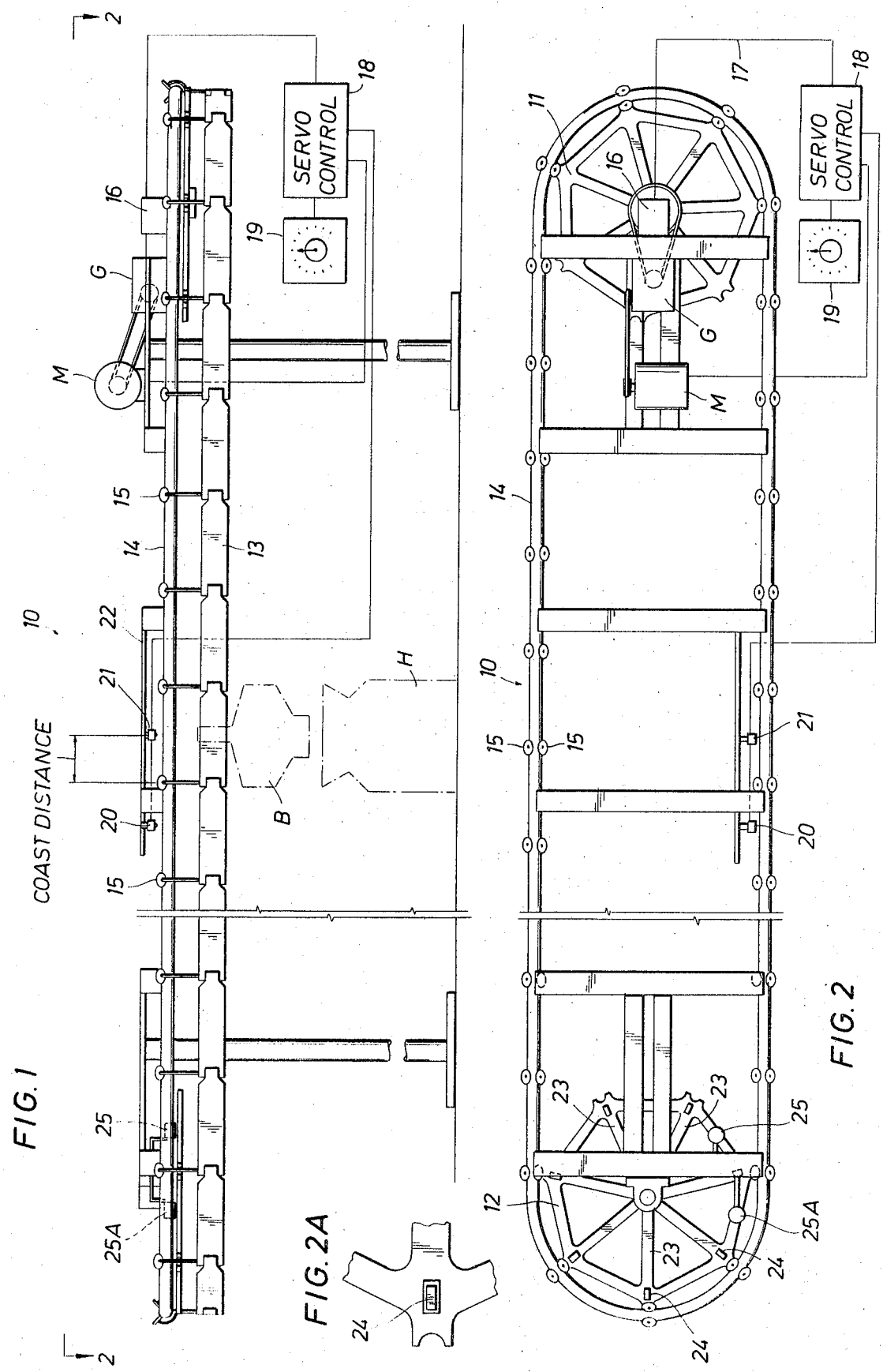

CONVEYOR SERVO MOTOR STOPPING CONTROL UNIT

This invention relates to a self balancing servo system used to control the movement and positioning of a controlled element, such as an endless conveyor which is to be positioned at discrete points, and in one of its aspects to discrete positioning control apparatus for use in such a system.

The movement and positioning of endless conveyor systems is generally controlled by a self balancing servo system which is well known in the art. However, in many instances it is necessary that the conveyor be accurately stopped at or very close to a discrete position. For example, where the conveyor is carrying a number of bins for loading or dumping, spillage may result if the bin is not stopped directly under or over a hopper. Because of the mass of the moving conveyor system, and the mechanism moving it, the servo system must function to apply a stop signal to the conveyor system at some fixed coast distance from a desired stopping point. In the usual servo control system for controlling stopping of a conveyor at a number of discrete positions, variable potentiometers or switched fixed resistors are used for providing a control signal in response to operator command to provide such a stop signal. However, because of parallax, it is virtually impossible to exactly position a potentiometer to cause the conveyor to stop at a precise location, and fixed resistors generally have some error, which even if small, could cause enough error in the positioning of the conveyor to cause spillage or other problems.

It is thus the primary object of this invention to provide a discrete positioning control apparatus in a servo control system for controlling the stopping of a control element at discrete points and which avoids the referred to problems of accurate positioning.

Another aspect of this invention is to provide such control apparatus for use in conjunction with the control of an endless conveyor system.

In servo systems controlling the movement of endless conveyors, the follow-up potentiometer is not a 360° element, and a gap is provided between positions representing substantially adjacent points on the conveyor. Thus, when the conveyor is positioned at or close to one of these points on one side of the gap, and it is desired to move the conveyor to, or close to, the other point on the other side of the gap, the conveyor must move close to 360° since it cannot cross the gap, which may be but a few degrees. In U. S. Pat. No. 2,786,169, a follow-up system is disclosed which permits the conveyor to take the short route, across the gap, by using a relay that responds to the voltage on a transmitting potentiometer as it approaches one side of the gap to switch the direction of the servo motor so that it will move in the right direction when the transmitting potentiometer and follow-up potentiometer cross the gap. However, this device requires that the direction of movement of the transmitting and follow-up potentiometers be the same and requires a special transmitting potentiometer, and does not use state of the art voltage level sensing and switching circuits.

It is thus another object of this invention to provide a conveyor system having a servo control system which accomplishes the above-mentioned objects, and also has improved, state of the art short route circuitry in which a standard and readily obtainable potentiometer may be employed as the transmitting element, and in which the short route circuitry will be effective regardless of the direction of movement of the transmitting potentiometer by the operator with respect to the shortest route.

These and other objects of this invention, which will become apparent upon consideration of the appended drawings and claims, and the following detailed description, are accomplished in the preferred embodiments illustrated by providing a switch means, which is actuated to provide marking signals each time the controlled element to be positioned by a self balancing servo system is a fixed coast distance from a discrete position at which the controlled element may be stopped. Means is provided for combining the mark signals with the servo error signal so that as the controlled element approaches the desired stopping position, represented by a diminishing error signal, and the switch adjacent this desired position is actuated, a stop signal will be generating for stopping drive to the controlled element and permitting it to coast to a stop. In this manner, even if the operator has erred slightly in the positioning of the transmitting potentiometer of the servo system, the stop signal will always be provided at precise point equal to the coast distance of the controlled element from the desired stopping point.

Also, where the controlled element is an endless belt or conveyor, short route circuit means is provided which causes the controlled element to move in a direction wherein the follow-up potentiometer crosses its gap when this route is substantially the shorter route to balance the servo system. The servo system includes a difference amplifier which provides a positive going error signal when the servo system is out of balance in one direction, and a negative going error signal when the servo system is out of balance in the other direction. The short circuit means includes circuitry for comparing the voltage level of the error signal, both positive going and negative going, with a reference voltage, for example, one-half of the full voltage across the follow-up and transmitting potentiometers. When the error voltage is positive and greater than the reference voltage, which would normally cause the servo motor to drive the controlled element in a direction to reduce the error voltage to zero, the servo system difference amplifier is overriden by a larger signal of opposite polarity which causes the direction of the servo motor to reverse and drive the control element in a direction where the wiper arm on the follow-up potentiometer crosses the gap. When this occurs, the override signel drops off and the system then balances under control of the servo difference amplifier. When the magnitude of the error signal at the difference amplifier is greater than minus the magnitude of the reference voltage, indicating that the shortest route to balance is across the gap of the follow-up potentiometer in a direction of movement opposite to that which the normally negative error signal would cause movement, the overriding action also occurs, but in the opposite direction.

Thus, the short route circuitry of this invention is bidirectional and provides for movement on the shortest route irrespective of which way the operator moves the potentiometer, and does not require that the transmitting potentiometer cross the gap.

In the drawings, wherein like reference numerals are used throughout to designate like parts, and wherein a preferred embodiment of this invention is illustrated, FIG. 1 is a side view in elevation of a conveyor system employing the servo control system of this invention, and illustrating two forms of the discrete positioners of this invention;

FIG. 2 is a top view of the apparatus of FIG. 1;

FIG. 2A is an enlarged view at 2A in FIG. 2;

Figure 3:
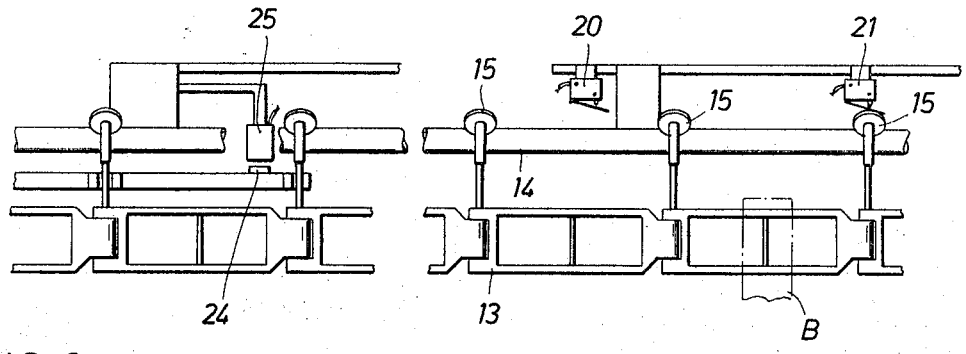
FIG. 3 is a partial, side view in elevation of the apparatus of FIG. 1 illustrating the mechanical operation of the discrete positioners of this invention.

Referring now to the drawings, in FIGS. 1 and 2 an endless belt conveyor system 10 is illustrated as being driven by a motor M through suitable gearing G. Conveyor 10 includes spaced apart sprocket wheels 11 and 12 with wheel 11 being driven, and an endless belt 13 riding on an endless track 14 through rollers 15. A follow-up potentiometer 16 may be mounted in a suitable housing to be driven by and follow the rotation of sprocket wheel 11, and is connected by a cable 17 to a servo control circuit 18. Also connected to servo control 18 is a transmitting potentiometer 19 mounted in a suitable housing with a suitable scale on it to indicate a desired stopping position for conveyor 10, and motor M. Thus, as so far described, a conventional servo control mechanism is provided for operating a conventional conveyor 10 by moving the conveyor to balance follow-up potentiometer 16 and transmitter potentiometer 19 whenever the operator moves potentiometer 19 to a new position. Also, in actual operation, conveyor system 10 will be stopped at a number of discrete positions, for example, at a position to unload a bin B into a hopper H in which case a small error in the positioning of transmitting potentiometer 19 may represent a sufficiently large error in the positioning of bin B with respect to hopper H to cause spillage. In order to accurately position conveyor 10 at a discrete position, two forms of switch mechanisms employed in the discrete positioner of this invention are illustrated in FIGS. 1 and 2, one form being illustrated on the right side of the broken line and the other form being illustrated on the left side of the broken line. It is to be understood, of course, that in actual practice only one such form of switching mechanisms will be employed with the conveyor system 10.

As shown on the right side of FIGS. 1, 2, and 3, two micro switches 20 and 21 are mounted on conveyor 10 by bracket 22 and arranged so that they are tripped by rollers 15 as they pass by the switches. Switch 20 may be positioned the coast distance from a discrete stopping position when conveyor 10 is moving in one direction, (the plurality of desired stopping positions of the conveyor generally being equally spaced along the conveyor) and switch 21 may be positioned the coast distance from a stopping position when conveyor 10 is moving in the other direction. Thus, each time a roller 15 trips one of the switches 20 or 21, the conveyor will be at its coast distance from a possible stopping position.

As shown in the left side of FIGS. 1, 2, and 3, and in FIG. 2A, wheel 12 includes a plurality (here 7) of equally spaced spokes 23 and a permanent magnet 24 is mounted on the top of each spoke 23 as shown in FIG. 2A. Reed switches 25 and 25A are mounted on conveyor 10 so that one of them is sufficiently close to one of magnets 24 when conveyor 10 is at its coast distance in one direction from a stopping position, to cause that reed switch to be activated, and the other is sufficiently close to one of magnets 24 when conveyor 10 is at its coast distance in the other direction from a stopping position to cause the other reed switch to be activated. Since the possible stopping positions of conveyor 10 are equally spaced, and magnets 24 are equally spaced, this would occur each time the conveyor is at its coast distance from a stopping position, to provide a marking signal from one of the reed switches 25 and 25A.

Thus, with each of the embodiments of the switch mechanisms described, a marking signal can be provided each time conveyor 10 is at its coast distance from a possible stopping position, during movement in either direction. When a desired stopping position is selected by the operator, circuit means is provided to permit only the proper marking signal (i.e., the one at the coast distance from the desired stopping position) to cause stopping of the drive to conveyor 10 and application of the conveyor braking mechanism. This circuitry is shown in FIG. 6, however, prior to description of FIG. 6, the principle of operation of the discrete positioner of this invention can be better understood by reference to FIGS. 4 and 5.

Figure 4:
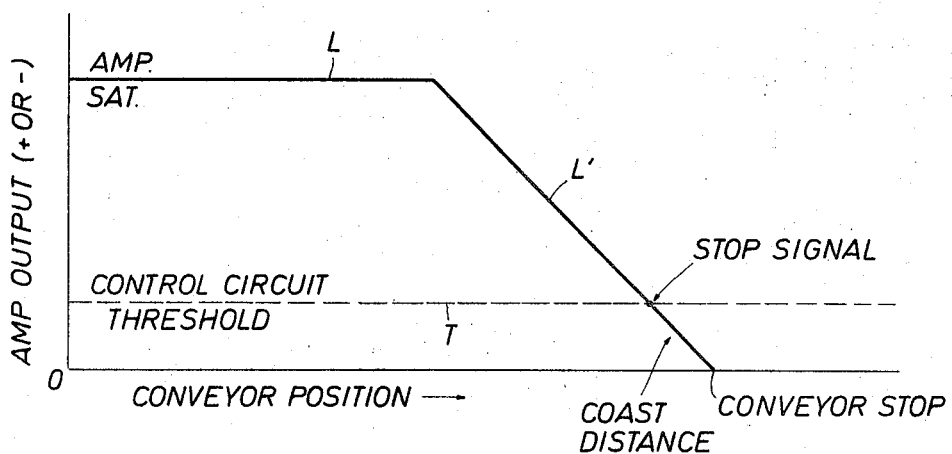
FIG. 4 is a graph illustrating operation of a conveyor system without the discrete positioner of this invention.

In FIG. 4, the operation of the control circuitry for conveyor 10, without the switching mechanisms 20, 21 or 25, 25A is illustrated. Signal level L represents the output of an error amplifier or the servo control signal, and the position of the conveyor, the servo amplifier being saturated until the conveyor approaches a selected stopping position, at which time signal level L diminishes to the level represented by slope L'. A threshold level T for the servo control circuit is provided so that with the gain of the servo system properly set, line L' will cross line T when conveyor 10 is at the proper coast distance from the stopping point. However, if the gain is not properly set, or if the transmitting potentiometer is not accurately set, line L' will not cross line T at the proper point to coast to a stop at the proper position.

Figure 5:
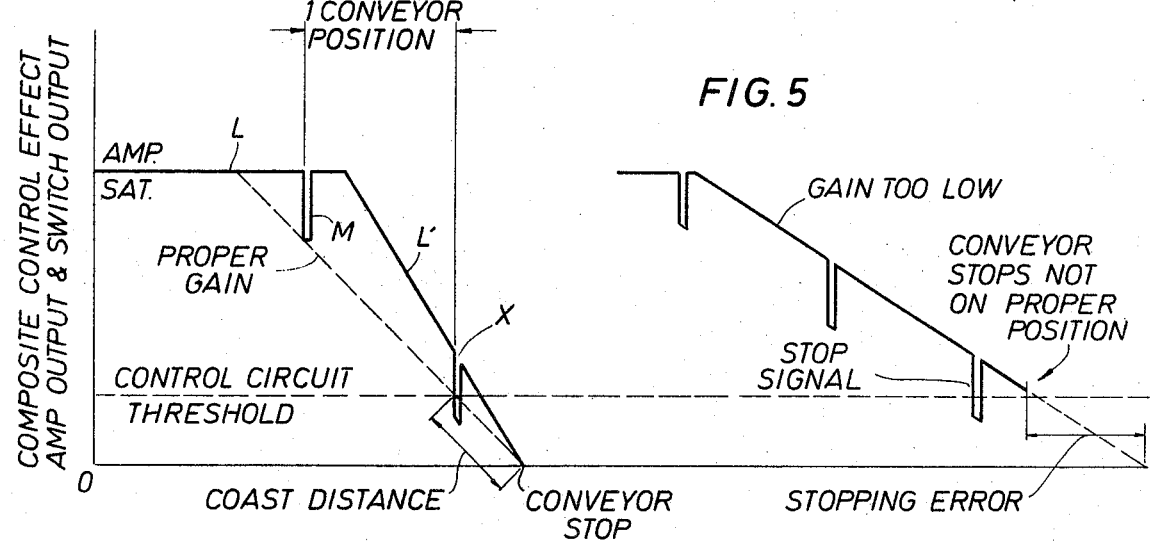
FIG. 5 is a graph illustrating the electrical operation of the discrete positioner of this invention.
Figure 6:
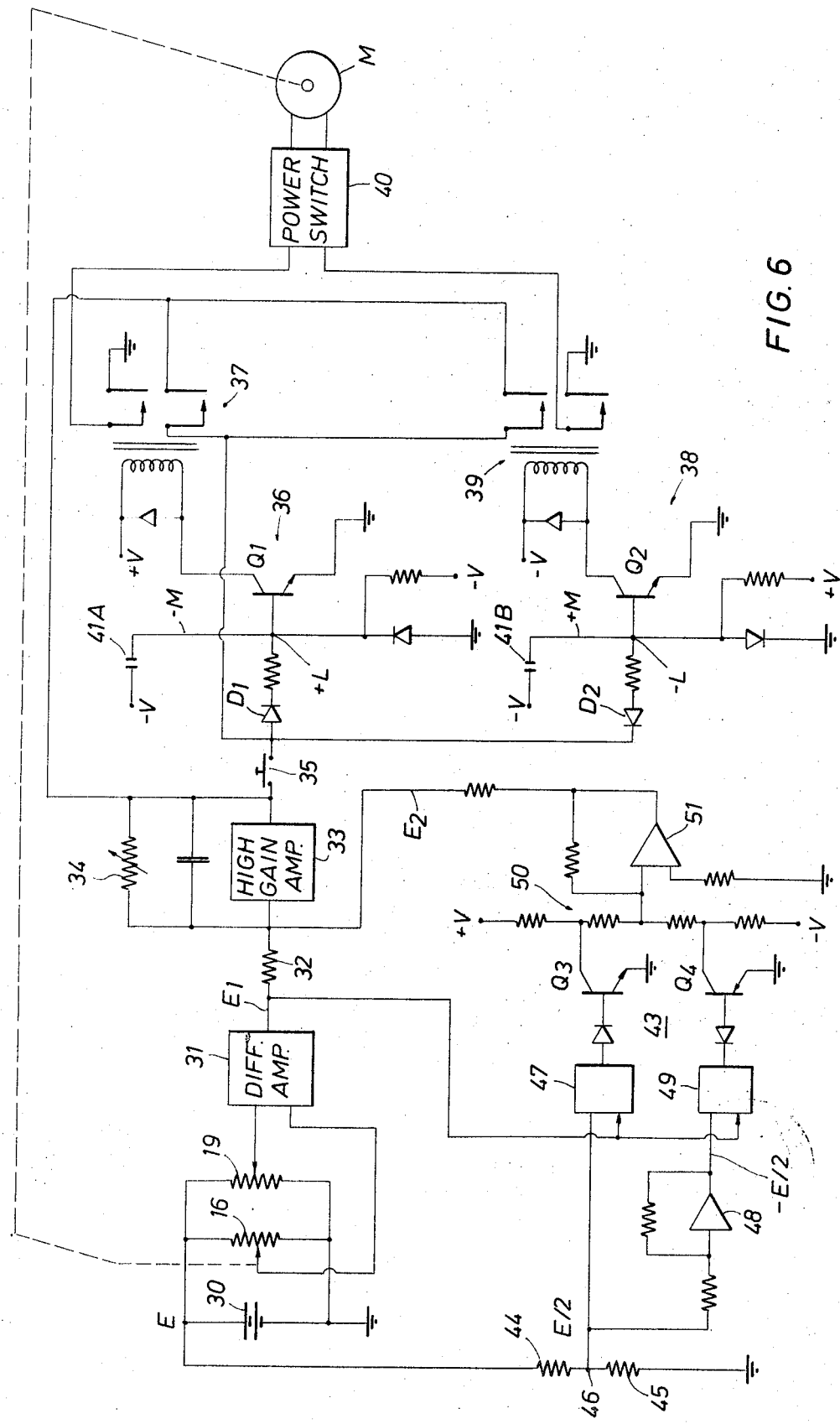
FIG. 6 is a detailed schematic diagram of the electronics employed in the control system of this invention, including both the discrete positioner and the short route circuitry.

FIG. 5 illustrates how switching mechanisms 20, 21, and 25, 25A operate as discrete positioners, by insuring that the signal level L will cross threshold T at the time when conveyor 10 is its coast distance from the desired stopping position. Each time roller 15 passes one of switches 20 and 21, or reed switches 25 and 25A are adjacent one of magnets 24, a marking signal M of opposite polarity to signal L will be provided which can be summed with signal L. When signal level L is at or near the saturation level and the gain of the system is set within limits, for example, when conveyor 10 is substantially more than its coast distance from the desired stopping position, signal M will not be sufficient to lower level L below threshold T, so conveyor 10 will continue to move. However, when the conveyor approaches the desired stopping position, and the coast distance from it, signal level L will have diminished and be on slope L' since the servo system is approaching balance. As this occurs, the appropriate switching mechanism is tripped, such as at point X on line L', and signal M will be combined with level L so that this level will fall below the level T, causing a stop signal to be applied to conveyor 10 and permitting it to coast to a stop. Since point X will be the correct coast distance from the stopping position, accurate positioning is assured, even though the gain of the servo system or the position of the transmitting potentiometer is not precisely set.

However, the gain of the servo system, even with the discrete positioner of this invention, must be set within limits. As illustrated in the right hand side of FIG. 5, if the gain of the servo system is set so that the combination of signals M and L, when the switching mechanism adjacent the stopping position is tripped, does not fall below level T, then proper positioning will not be provided. However, since the combination of L and M will fall below T over a limited range of line L' (depending on the value of signal M) accurate setting of the gain is not as important as without the discrete positioner of this invention, and errors due to drift are less likely to occur.

In FIG. 6, a schematic is shown of the circuitry of the discrete positioner described, and of the short route circuitry of this invention. Conventional servo control circuitry is illustrated as including a D.C. source 30 of reference voltage E (for example 5 volts) having follow up potentiometer 16 and transmitting potentiometer 19 connected across it so that the voltage at their wiper arms vary from 0 – E volts. The wiper arms of potentiometers 16 and 19 are conducted to a difference amplifier 31 which provides an output error voltage $E_1$ responsive to the difference between the voltages on the wiper arms of potentiometers 16 and 19. If desired for impedance matching and buffering, unity gain operational amplifiers (not shown) may be connected between the wiper arms of each of the potentiometers 16 and 19 and amplifier 31. Thus, for example, difference voltage $E_1$ would be zero when the wiper arms of potentiometers 16 and 19 are set at the same place, and may vary from 0 – ±E volts. The polarity of $E_1$ will depend on the direction that conveyor 10 must move to restore balance of the system. Signal $E_1$ is conducted through a resistor 32 to a high gain amplifier 33 having a gain adjust control 34. Amplifier 33 serves to provide amplifications of the error signal and to permit the gain of the system to be adjusted so that the threshold level of the control circuits (to be described) is reached when conveyor 10 is substantially at the coast distance from stop. The output of amplifier 33 is conducted through a push button start switch 35 and a diode $D_1$ to a positive error output circuit 36 including a transistor $Q_1$ connected at its collector to the coil of a relay 37, and through a diode $D_2$ to a negative error signal output circuit 38 including a transistor $Q_2$ connected at its collector to the coil of a relay 39. When the drive voltage on the bases of of each of transistors $Q_1$ and $Q_2$ exceeds a threshold level (such as T in FIG. 5) then these transistors are driven to conduction to close their respective relays. Only positive going error signals are conducted through diode $D_1$ to transistor $Q_1$ and the contacts of relay 37 are connected to a power switch 40 in a manner to cause motor M to turn in a direction reducing the positive error voltage. Only negative going error signals are conducted through diode $D_2$ and the contacts of relay 39 are connected to power switch 40 in a manner to cause motor M to move in the opposite direction, driving the error to zero. The contacts of each of relays 37 and 39 are also connected in shunt with switch 35 so that when switch 35 is activated and then released, one of the relays will keep the circuit between amplifier 33 and circuits 36 and 38 closed until the closed relay opens in response to the threshold level at the base of its respective drive transistor being reached.

Contacts 41A or 41B of either of switches 20, 21 or 25, 25A, depending on which version is used, are also connected between a source of voltage (not shown) and the base of each of transistors $Q_1$ and $Q_2$. Contacts 41A, which would be the contacts of the switch (being all the switches 20 or 21 wired in parallel, if the switches 20, 21 are used), which is the coast distance from a possible stopping position when the conveyor is moving in a direction to reduce the error signal $E_1$ from some positive value, are connected between a source of negative voltage −M and the base of transistor $Q_1$ so that when the contacts 41A are closed a negative signal −M is summed with a positive servo control signal L to drive signal level L below the threshold level T, releasing relay 37.

Contacts 41B, which would be the contacts of the reed switch 25 or 25A or micro switches 20 or 21 (wired in parallel) on the other side of the possible stopping position, are connected between a source of positive voltage +M to the base of transistor $Q_2$ so that when the contacts 41B are closed a positive signal +M is summed with a negative servo control signal −L to drive the magnitude of signal level −L below the magnitude of threshold level T, releasing relay 38. Thus, marking signals M and −M are provided each time conveyor 10 is its coast distance in either direction from a possible stopping position, and when the marking signal and the servo control signal fall below the circuit threshold, a stop signal will provide for stopping drive to conveyor 10.

A short route circuit 43 is also shown in FIG. 6 as a loop connected between voltage source 30 and the input of high gain amplifier 33. Short route circuit 43 includes two voltage divider resistors 44 and 45 connected in series and across source 30 to provide a reference voltage E/2 at a junction 46 between them. Junction 46 is connected to one input of a positive difference amplifier 47, and through an invertor 48 having a gain of −1 to one input of a negative difference amplifier 49. The other inputs of difference amplifiers 47 and 49 are connected to the output of difference amplifier 31 so that amplifier 47 compares the voltage E/2 with the signal level $E_1$, representing the servo error signal, and amplifier 49 compares the signal $E_1$ with −E/2. The output of amplifier 47 is conducted to the base of a transistor $Q_3$, and the output of amplifier 49 is conducted to the base of a transistor $Q_4$. The collectors of these transistors are connected in a voltage divider string 50, having four resistors of equal resistance, connected between source of equal voltage of opposite polarity, and connected at its mid point to the input of an inverting amplifier 51 providing an output $E_2$. The output $E_2$ of amplifier 51 is connected to the input of amplifier 33, on the other side of resistor 32 from the output of amplifier 31, where it is summed with $E_1$. If the voltage level $E_1$ is larger than E/2 volts (meaning that potentiometer 16 is one-half the potentiometer or more in one direction from potentiometer 19), the output of amplifier 47, which is normally positive, will go negative and cut off transistor $Q_3$. When transistors $Q_3$ and $Q_4$ are conducting, as they normally do, the output $E_2$ of amplifier 51 is zero. However, when transistor $Q_3$ stops conducting causing the voltage level at the input of amplifier 51 to rise to E, the inverted output $E_2$ of amplifier 51 becomes $-E$ which is summed with and overcomes the error signal $E_1$ to cause the conveyor to be driven in the direction opposite to that normally required to balance the servo.

If the voltage level $E_1$ is larger negative than $-E/2$ (meaning that potentiometer 16 is one-half the potentiometer or more in the other direction from the set position of potentiometer 19) the output of amplifier 49, which is normally negative, will go positive and normally conducting transistor $Q_4$ will stop conducting, and the voltage at the input of amplifier 51 will go to $-E$ volts so that its output $E_2$ will be E volts. This output is again summed with the voltage $E_1$, again reversing the normal direction of the conveyor required to restore balance of the servo system. When the error signal $E_1$ is less than $E/2$ or $-E/2$ volts, in which case the shortest route to balance is not across the gap of the follow up potentiometer, the short route circuitry will not come in effect.

By way of example in explaining the operation of the short route circuitry, assume that $E = 5$ volts and the position of potentiometer 61 with respect to a desired position represented by potentiometer 19 was such that the error signal $E_1$ was 4 volts positive (0.0 – 5 volts thus representing approximately 0° – 360° rotation of the conveyor), such as would be the case if the voltage at the wiper arms of potentiometer 16 was 4.5 volts and the voltage at the wiper arms of potentiometer 19 was 0.5 volts. This means that normally conveyor 10 would be driven about 288° (four-fifths of 360°) in a direction to cause the wiper arm of potentiometer 16 to move to a position of 0.5 volts, or reduction of 4 volts. However, with the condition stated short route circuit output $E_2$ would be negative 5 volts which would be summed with the positive four (4) volts error signal $E_1$ to provide a composite error signal $(E_2 - E_1)$ of negative 1 volts at the input of amplifier 33. This causes conveyor 10 to be driven in the direction to cause the follow up potentiometer to cross its gap. As this occurs, the composite error sinnal goes to negative 0.5 volts since potentiometer 16 is driven to its full (5 volts) position to provide a difference signal with respect to the position of potentiometer 19 of 4.5 volts which is summed with the $-5$ volt short route signal. Potentiometer 16 then crosses its gap to the approximately zero volts position. When this occurs, error signal $E_1$ then falls below 2.5 volts (i.e., will be about negative 0.5 volts) and signal $E_2$ drops out, and the servo continues to move in the same direction until signal $E_1$ becomes or approaches zero. Thus, the balance position of the servo can be reached with only rotation through about 72° (one-fifth of 360°) instead of about 288°.

If the position of the potentiometer were reversed so that error signal $E_1$ was greater than negative 2.5 volts and potentiometer 16 was close to its gap on its low voltage end, the movement under control of the short route circuitry would be in the opposite direction, but otherwise substantially as described.

Thus, a conveyor system and control therefore has been described which includes a discrete positioner for providing accurate and repeatable positioning, and in which the conveyor will take the short route to a desired position in either direction of movement.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth (or shown in the accompanying drawings) is to be interpreted as illustrative and not in a limiting sense.

The invention having been described, what is claimed is:

1. A conveyor system for delivering objects from a first position to a second position along the system, comprising, in combination:

a frame;

an endless conveyor mounted on said frame and having a plurality of discrete stopping positions;

a prime mover mounted on said frame for driving said conveyor between said positions in two directions of movement;

a plurality of spaced index means mounted on said endless conveyor and adapted to pass a first fixed point on said frame whenever said endless conveyor is at its coast distance in one direction of movement of the controlled element from a first desired stopping position, and to pass a second fixed point on said frame when said endless conveyor is at its coast distance in the other direction of movement of the controlled element from a second desired stopping position;

follow up means responsive to the position of said controlled element to provide a first electrical signal the magnitude of which is representative of such position;

control means for providing a second electrical signal the magnitude and direction of which is representative of one of said first and second desired stopping positions for said controlled element;

electronic comparator means responsive to said first and second electrical signals to provide an error signal, said prime mover being responsive to said error signal to drive said controlled element towards the desired stopping position until said error signal falls below a predetermined threshold level;

first switch means mounted with respect to said endless conveyor at substantially said first fixed point to be activated by said index means and provide a marking signal when said endless conveyor is at substantially the coast distance from said first desired stopping position;

second switch means mounted with respect to said endless conveyor at substantially said second fixed point to be activated by said index means and provide a marking signal when said endless conveyor is at substantially the coast distance in the other direction of movement of the controlled element from a second desired stopping position;

means connected to said first and second switch means for conducting said marking signals to said electronic comparator for causing said error signal to fall below said threshold level when said endless conveyor is substantially at said coast distance from said first or second desired stopping position, and provide a stop signal; and means responsive to said stop signal for stopping said endless conveyor.

2. The conveyor system of claim 1 wherein one of said switch means and index means are reed switches, and the other of said switch means and index means are permanent magnets.

3. The conveyor system of claim 1 further including a spoked wheel rotatably mounted on said frame for supporting said endless conveyor, said wheel having a plurality of substantially equally spaced spokes, and wherein said first and second switch means are reed switches mounted respectively at said first and second fixed points, and said index means are permanent magnets mounted on each of said spokes.

4. The conveyor system of claim 1 wherein said index means are rollers spaced along said conveyor and said first and second switch means are microswitches adapted to be actuated by said rollers.

* * * * *